Patented Aug. 19, 1947

2,426,154

UNITED STATES PATENT OFFICE 2,426,154

STABILIZATION OF PEROXIDE SOLUTIONS

Joseph S. Reichert and Alfred T. Hawkinson, Niagara Falls, N. Y., assignors to E. I. du Pont de Nemours & Company, Wilmington, Del., a corporation of Delaware No Drawing. Application April 1, 1942, Serial No. 437,194

13 Claims. (Cl. 23—207.5)

This invention relates to a new and improved method for stabilizing solutions of peroxides. More particularly, it relates to a new and improved method of stabilizing commercial aqueous solutions of hydrogen peroxide. Such solutions are frequently stored for extended periods, and our invention makes possible storage without substantial loss in peroxide strength.

More especially, our invention is concerned with improving the stability of solutions of peroxides which have already been stabilized in accordance with known procedures, by the incorporation in those solutions of an organic acid which serves as a buffering agent for maintaining the pH of the solution in the range wherein the stabilizing agent employed exerts maximum effectiveness. In its preferred form, our invention relates to the incorporation in aqueous solutions of hydrogen peroxide, in association with the usual stabilizing agents, of various saturated aliphatic organic compounds, more particularly saturated carboxylic acids, which serve to buffer the solution of hydrogen peroxide and maintain its pH value within the range wherein the stabilizing agent exerts maximum action.

The stability of peroxide solutions, more particularly the stability of the commercial aqueous solutions of hydrogen peroxide, whether of higher or lower peroxide concentrations, is greatly affected by the presence of foreign materials in those solutions. A solution of hydrogen peroxide which has been purified to a high degree is stable and, under proper conditions, may be stored for a relatively long period of time without appreciable decomposition. However, the introduction into such a solution of the ions of heavy metals, such for example as ions of the metals copper and iron, even when present in concentrations as low as one part per million, would bring about rapid decomposition of the peroxide due to the catalytic action of the metal ions. For this reason stabilizing agents or decomposition inhibitors (anti-catalysts) are generally introduced into commercial solutions of peroxides in order to protect the solutions against decomposition which might result from the chance introduction of catalytic impurities.

The pH of an aqueous solution of a peroxide, more particularly that of a commercial aqueous solution of hydrogen peroxide, whether dilute or concentrated, is an important factor influencing stability. In general, increase in the acidity of the solution will not adversely affect its stability as determined at pH values of 5.5 or below, and may in fact increase it. As a rule, however, the resulting increased stability is not sufficiently great to meet present-day commercial requirements. On the other hand, if the solution is rendered more alkaline, so that it possesses a pH value in excess of 6.0, its stability during an extended period of storage is unsatisfactory, whether a stabilizing agent is present in the solution or not.

In previous practice, in order to be certain that the pH value of the peroxide solution was far removed from that point at which instability upon storage would begin, such solutions have generally been rendered strongly acid in reaction, or they have been employed in conjunction with strongly acid materials. The pH of such solutions has thus been relatively low, in many cases 2.5 or below. More recently there has been a trend toward the stabilization of such solutions under less acid conditions. For example, the Reichert Patent No. 1,958,204 issued May 8, 1934, while disclosing that it is possible to stabilize solutions of hydrogen peroxide at pH values falling within the range 2.0 to 6.0, is more particularly concerned with stabilizing such solutions within the less acid range 4.0 to 5.0.

It has also been observed that where solutions of peroxides having a pH in the neighborhood of 4.0 or below are stored for extended periods, especially when the solutions are stored in glass containers, there is a tendency for the pH to increase in many cases even as high as 6.0 or above. This is the result of extraction of alkali from the glass of the container. The tendency is especially marked in the case of dilute solutions of hydrogen peroxide, which solutions are subject to considerable change in pH value even by the introduction thereinto of relatively small amounts of acids or alkalies.

We have now discovered that solutions of hydrogen peroxide and of other peroxides, which solutions contain stabilizing agents, may be buffered within a desired pH range by the introduction thereinto of certain relatively weak organic acids. These acids are saturated aliphatic acids, more particularly carboxylic acids having at least two carbon atoms, and may either be monobasic or polybasic. They are also characterized, more specifically, by having ionization constants ranging from $10^{-4}$ to $10^{-6}$ and having a solubility in water at 20° C. at least equal to 0.05 gram per liter. When present in small amounts in the solution they serve to prevent variance of the pH of the solution during storage, outside the range in which the stabilizing agent possesses its greatest effectiveness. Moreover, the buffering acids prevent undue elevation in the pH of a peroxide solution which is stored in glass for protracted periods, and combat any tendency toward an alkaline condition resulting from alkali being dissolved out of the glass.

It is accordingly one of the objects of our invention to incorporate in solutions of peroxides, more particularly in commercial aqueous solutions of hydrogen peroxide, agents which will serve to buffer those solutions and to maintain their pH within a desired range regardless of the conditions under which the solutions are stored, this narrow range being that in which the stabilizing agent or agents present in the peroxide solution exert their greatest effectiveness. Another object of this invention is the incorporation in peroxide solutions, more particularly in aqueous solutions of hydrogen peroxide, of small amounts of certain saturated carboxylic acids, these acids serving to operate as effective buffering agents and to cooperate with the stabilizing agent or agents present in the peroxide solutions to render those solutions stable during storage. These and still further objects of our invention will be apparent from the ensuing disclosure of certain preferred embodiments thereof.

The saturated carboxylic acids which we have found effective for buffering solutions of peroxides against change in pH are all acids that may be incorporated without adversely affecting the stability of the peroxide and which, when present, will cooperate with the stabilizing agent or agents present to maintain the pH within a desired narrow range, the range of greatest effectiveness of the stabilizer. The acids which we have found utilizable for this purpose are saturated aliphatic acids, more particularly saturated aliphatic carboxylic acids, whether monobasic or polybasis, which acids contain at least two carbon atoms, their ionization constants falling within the range $10^{-4}$ to $10^{-6}$, and having a solubility in water at 20° C. equal to or greater than 0.05 gram per liter. In addition to unsubstituted saturated carboxylic acids, various substituted acids are also utilizable, examples thereof being the hydroxy substituted acids lactic, tartaric, and citric acids, and the amino substituted acid glutamic acid.

Among specific acids found suitable for use as buffering agents and serving to stabilize solutions of peroxide in conjunction with the usual stabilizing agent or agents present, there may be mentioned first the saturated monobasic carboxylic acids containing at least two carbon atoms and having ionization constants and water solubilities meeting the requirements noted above. These acids include acetic acid, propionic acid, butyric acid, valeric acid, caproic acid, heptylic (oenanthic) acid, caprylic acid, nonylic (pelargonic) acid and capric acid. Saturated monobasic acids having a greater number of carbon atoms than capric acid are generally so insoluble as to prevent their utilization.

Among dibasic saturated carboxylic acids having at least two carbon atoms, and having ionization constants and water solubilities meeting the requirements above noted, we may specifically mention malonic acid, succinic acid, glutaric acid, adipic acid, pimelic acid, suberic acid, azelaic acid, and sebacic acid. The group of dibasic carboxylic acids constitutes our preferred class, and of these acids adipic acid has been found in practice to give most uniformly satisfactory results and to constitute the most desirable buffering acid, both from the chemical and economic points of view. Substituted dibasic acids, such s tartaric acid and gultamic acid (alpha-amino glutaric acid) have also been found to give very satisfactory results. The simplest dibasic carboxylic acid, oxalic acid, $(COOH)_2$, is not operative and is not included within the general definition since it is stronger acid having an ionization constant of $3.8 \times 10^{-2}$.

Among tricarboxylic acids, citric acid has been found to give very satisfactory results.

We have found that quantities of these acids ranging from 0.05 gram to 10.0 grams per liter of peroxide solution are necessary in order to secure most efficient buffering action, the particular amount utilized to some extent depending on the concentration of the peroxide solution and the pH value which it is desired to maintain in that solution. The buffering acids are effective in peroxide solutions of almost any concentration, and are particularly effective in aqueous solutions of hydrogen peroxide having concentrations ranging from 10 volumes to 100 volumes. It might be noted that the volume concentration of a peroxide solution is defined as the number of cubic centimeters of oxygen gas (measured at 0° C. and 760 mm. of mercury pressure) which will be liberated from one cubic centimeter of the solution measured at 20° C. upon complete decomposition of the peroxide present therein. A solution of hydrogen peroxide of 10 volume concentration contains 3.01% $H_2O_2$ by weight, while a 100 volume solution contains 27.6% $H_2O_2$ by weight.

We have found that the novel buffering agents are effective when utilized to buffer solutions of hydrogen peroxide which are acid in reaction, which solutions contain one or more of those stabilizing agents which are effective in the acid range. Thus, we have found the buffering acids specified particularly effective when the solution of hydrogen peroxide is stabilized with the sodium pyrophosphate-sodium stannate stabilizer disclosed in the previously referred to Reichert patent. When the acidic solution of hydrogen peroxide or other peroxide is stabilized with any suitable stabilizing agent effective in the acid range and buffered by the addition of one or more of the specified buffering acids, efficient stabilization is secured regardless of the period of storage. We have observed that effective stability during storage is secured even when the peroxide solutions are stored under extreme conditions, such for example as at very low or very high temperatures.

Instead of the specified carboxylic acids, their neutral, basic, or acid salts may be employed, provided that after the addition of the salts the solutions are subsequently acidified by the addition of strong inorganic acids such as hydrochloric or sulfuric acids, or by the addition of the organic buffering acid itself, thereby adjusting the pH of the peroxide solution within the desired range. As an illustration, a solution of hydrogen peroxide might be stabilized by the addition thereto of from 0.005 grams to 0.1 gram of tin per liter as sodium stannate, and from 0.02 grams to 0.2 gram per liter of sodium pyrophosphate. An alkali metal salt of the desired polybasic organic acid might then be added in amount equivalent to the amount of acid necessary to secure adequate buffering action. Upon acidification of the solution with any strong inorganic acid to the desired pH, there will be produced a buffered stabilized solution exhibiting the improved keeping properties attainable by the use of our procedure.

Solutions prepared from any of the metal peroxides also may be buffered by the incorporation therein of our improved acid buffering agents. For example, acidified solutions of the alkali and alkaline earth metal peroxides, generally considered equivalent to hydrogen peroxide, may be similarly treated to produce stabilized buffered solutions. Under such conditions a combination of an organic buffering acid and a strong inorganic acid will be utilized, the strong acid operating to neutralize the alkali present, while the organic acid imparts the desired buffering effect.

A preferred method for carrying out our improved process, employing stabilizing agents effective in the acid range and our carboxylic acid buffering agents, may now be given as illustrative. The peroxide solution is first stabilized by the addition thereto of any suitable stabilizer, for example sodium stannate present in amounts ranging from 0.005 to 0.1 gram per liter of tin, and sodium pyrophosphate present in amounts ranging from 0.02 to 0.2 gram per liter. Its pH is then suitably adjusted by the addition of the buffering acid. If adipic acid, our preferred buffering acid, is utilized, this acid is added until the pH falls within a preferred pH range, for example 3.5 to 4.0.

While the sodium stannate-sodium pyrophosphate combination stabilizing agent is our preferred stabilizer for use in conjunction with the buffering acids, other stabilizing agents effective in the acid range may be utilized with equal effectiveness. Among such stabilizers we may specifically mention salicylic acid, p-amino benzoic acid, and phenacetin. Effective buffering action and resulting improved stability on storage will be obtainable by following our procedure with peroxide solutions anywhere on the acid side. However, for best results we prefer to adjust the pH within the range 2.0 to 6.0 and, in order to secure most desirable results, more narrowly within the pH range 3.5 to 4.5.

While our improved procedure has been found most effective in practice for preparing buffered stabilized solutions of hydrogen peroxide of concentrations ranging from 10 volume to 100 volume, which solutions are intended to possess superior stability on storage, solutions of greater peroxide strength, for example solutions as concentrated even as 200 volume hydrogen peroxide, can be effectively buffered by the addition of our carboxylic acid buffering agents.

As examples of buffered stabilized solutions of peroxygen compounds prepared in accordance with our improved procedure and exhibiting outstanding stability over prolonged periods of storage, the following may be given.

*Example 1*

A solution of hydrogen peroxide of 100 volume concentration, stabilized by the addition of 250 parts per million of tin in the form of sodium stannate and 500 parts per million of tetrasodium pyrophosphate, was prepared. To this solution adipic acid was added in the amount of 4 grams of the acid per liter of solution. The pH of the solution was then carefully adjusted to 4.2 by the addition of a small amount of aqueous ammonia.

The stabilized solution containing the buffering acid was stored in a glass carboy at room temperature for a period of ten months. At the end of this time analysis showed that but little decomposition of the peroxide had occurred, the solution having a high degree of stability over the long period of storage.

Various samples of 10 volume hydrogen peroxide solution were prepared by diluting one part of the 100 volume solution by the addition thereto of nine parts of water. These samples of 10 volume concentration which had a pH of 4.7 were stored at 32° C. for a period of ten months and showed very satisfactory stability during the entire period. When packaged in the usual soft glass bottle utilized by the trade for distributing 10 volume solutions of hydrogen peroxide, the losses were found to be only 0.02 volume per month, and the pH was substantially unchanged. Under the same conditions of storage 10 volume peroxide at pH of 4.7 containing no adipic acid extracted sufficient alkali from the soft glass to increase the pH to 8.0 and caused large losses of peroxide.

*Example 2*

An aqueous solution of hydrogen peroxide of 10 volume concentration was prepared, this solution containing as the stabilizing agent 0.04 gram of sodium pyrophosphate and 0.02 gram of tin as sodium stannate, per liter of solution. To this solution there was added 0.15 gram of succinic acid per liter. Subsequent thereto the pH was carefully adjusted to 4.7 by the addition of a small amount of aqueous ammonia.

When stored in soft glass containers there was substantially no change in either pH or volume concentration during ten months' storage.

*Example 3*

A buffered stabilized solution of hydrogen peroxide of 10 volume concentration was prepared and stabilized by the addition thereto of 0.04 gram of sodium pyrophosphate and 0.02 gram of tin as sodium stannate per liter of solution. To this solution tartaric acid in the amount of 0.07 gram per liter was added as a buffering acid. The pH of the solution was then adjusted to 4.7.

Upon storage over a prolonged period, no appreciable decomposition of the peroxide solution occurred. The change in pH of the solution was negligible.

The above procedure was repeated, using 0.11 gram of citric acid per liter of solution as buffering acid in place of the tartaric acid. During all conditions of storage the effectiveness of citric acid in buffering the solution was apparent, and even when subjected to extreme conditions excessive decomposition of peroxide did not occur.

When 0.26 gram of glutamic acid per liter of solution was utilized in place of the tartaric acid as buffering acid, equally satisfactory stability on storage was secured.

While our improved procedure for preparing buffered stabilized solutions of peroxygen compounds is useful in various fields, including the field of preparing for sale aqueous solutions of hydrogen peroxide of high concentration, it is particularly useful in the pharmaceutical field. For the pharmaceutical trade, and in beauty parlors and similar establishments, dilute solutions of peroxides are frequently stored for prolonged periods in soft glass containers. The extraction of alkali from the glass frequently raises the pH of the solution to a point at which the stabilizer present therein no longer exerts satisfactory action. By incorporating in the solution a small amount of a carboxylic buffering acid, not only is the solution buffered to such an extent that the dissolved alkali has no detrimental effect, but the organic acid serves to maintain the pH of the solution during all conditions of storage at such a value that maximum inhibiting action is exerted by the stabilizing agents present. Our procedure makes it possible for the first time to store stabilized dilute solutions of hydrogen peroxide which are but slightly acid in reaction in soft glass containers for prolonged storage periods without excessive decomposition.

Various changes may be made in the procedure described as illustrative of preferred embodiments of our invention without departing from the scope thereof. Accordingly, the scope of our invention is to be construed in accordance with the prior art and appended claims.

We claim:

1. The method of maintaining the stability of an aqueous solution of a peroxide which is acid in reaction under conditions of storage which comprises incorporating therein a peroxide stabilizer effective in the acid range, and as a buffering agent, a saturated aliphatic dibasic acid, having an ionization constant falling within the range $10^{-4}$ to $10^{-6}$, and having a solubility at 20° C. at least equal to 0.05 gram per liter.

2. The method of maintaining the stability of an aqueous solution of hydrogen peroxide which is acidic in reaction under various conditions of storage which comprises incorporating therein a peroxide stabilizer effective in the acid range and, as buffering agent, a saturated aliphatic dibasic acid, having an ionization constant falling within the range $10^{-4}$ to $10^{-6}$ and a solubility at 20° C. at least equal to 0.05 gram per liter.

3. The method of maintaining the stability of an aqueous solution of a peroxide, said solution being acid in reaction, under storage conditions which comprises incorporating therein a peroxide stabilizer effective in the acid range and, as buffering agent, a saturated aliphatic dibasic acid selected from the group which consists of malonic acid, succinic acid, glutaric acid, adipic acid, pimelic acid, suberic acid, azelaic acid, and sebacic acid.

4. The method of maintaining the stability of an aqueous solution of hydrogen peroxide which is acidic in reaction under storage conditions which comprises incorporating therein a peroxide stabilizer effective in the acid range and, as buffering agent, a saturated aliphatic dibasic acid selected from the group which consists of malonic acid, succinic acid, glutaric acid, adipic acid, pimelic acid, suberic acid, azelaic acid, and sebacic acid.

5. The method of maintaining the stability of an aqueous solution of hydrogen peroxide having a pH falling within the range 2.0 to 6.0 under conditions of storage which comprises incorporating therein a peroxide stabilizer effective in the acid range, and as buffering agent, adipic acid present in amounts ranging from 0.05 gram to 10.0 grams per liter of solution.

6. A buffered stabilized solution of a peroxide having a pH falling within the range 2.0 to 6.0 and containing a peroxide stabilizer effective in the acid range and, as buffering agent, a saturated aliphatic diabasic acid having an ionization constant falling within the range $10^{-4}$ to $10^{-6}$, and a solubility at 20° C. at least equal to 0.05 gram per liter.

7. A buffered stabilized aqueous solution of hydrogen peroxide having a pH falling within the range 2.0 to 6.0 and containing a peroxide stabilizing agent and, as buffering agent, a saturated aliphatic diabasic acid having an ionization constant falling within the range $10^{-4}$ to $10^{-6}$, and a solubility at 20° C. at least equal to 0.05 gram per liter.

8. A buffered stabilized aqueous solution of a peroxide having a pH falling within the range 2.0 to 6.0 and containing a peroxide stabilizer effective in the acid range, and, as buffering agent, a saturated aliphatic diabasic acid selected from the group which consists of malonic acid, succinic acid, glutaric acid, adipic acid, pimelic acid, suberic acid, azelaic acid, and sebacic acid.

9. A buffered stabilized aqueous solution of hydrogen peroxide having a pH falling within the range 2.0 to 6.0 and containing a peroxide stabilizer effective in the acid range and, as buffering agent, an aliphatic saturated dibasic acid selected from the group which consists of malonic acid, succinic acid, glutaric acid, adipic acid, pimelic acid, suberic acid, azelaic acid, and sebacic acid.

10. A buffered stabilized aqueous solution of a peroxide having a pH falling within the range 2.0 to 6.0 and containing a peroxide stabilizer effective in the acid range and, as buffering agent, adipic acid.

11. A buffered stabilized aqueous solution of hydrogen peroxide having a pH falling within the range 2.0 to 6.0 and containing a peroxide stabilizer effective in the acid range and, as buffering agent, adipic acid.

12. A buffered stabilized aqueous solution of a peroxide having a pH falling within the range 2.0 to 6.0 and containing a peroxide stabilizer effective in the acid range and, as buffering agent, succinic acid.

13. A buffered stabilized aqueous solution of a peroxide having a pH falling within the range 2.0 to 6.0 and containing a peroxide stabilizer effective in the acid range and, as buffering agent, glutaric acid.

JOSEPH S. REICHERT.
ALFRED T. HAWKINSON.

REFERENCES CITED

The following references are of record in the file of this patent:

UNITED STATES PATENTS

| Number | Name | Date |
| --- | --- | --- |
| 2,027,839 | Reichert | Jan. 14, 1936 |

FOREIGN PATENTS

| Number | Country | Date |
| --- | --- | --- |
| 409,361 | Great Britain | Apr. 30, 1934 |
| 15,993 | Great Britain | 1888 |
| 435,401 | Great Britain | Sept. 17, 1935 |

OTHER REFERENCES

"Oxidation of Some Dibasic Acids," W. H. Hatcher et al., Canadian Journal of Research, vol. 3 (1930).

"A Study of the Oxidation of Some Dicarboxylic Acids by Hydrogen Peroxide in the Presence of Certain Catalysts," James H. Walton et al., Journal of the American Chemical Society, vol. 50, pp. 1641-8 (1928).